(12) United States Patent
Meegan et al.

(10) Patent No.: US 11,111,333 B2
(45) Date of Patent: Sep. 7, 2021

(54) RESIN COMPOSITIONS AND RESIN INFUSION PROCESS

(71) Applicant: Cytec Industries Inc., Princeton, NJ (US)

(72) Inventors: Jonathan E. Meegan, Chester (GB); Marco Aurilia, Naples (IT)

(73) Assignee: Cytec Industries Inc., Princeton, NJ (US)

( * ) Notice: Subject to any disclaimer, the term of this patent is extended or adjusted under 35 U.S.C. 154(b) by 0 days.

(21) Appl. No.: 16/169,062

(22) Filed: Oct. 24, 2018

(65) Prior Publication Data

US 2019/0127514 A1 May 2, 2019

(30) Foreign Application Priority Data

Oct. 26, 2017 (GB) ...................... 1717639

(51) Int. Cl.

| | | |
|---|---|---|
| *C08G 59/38* | (2006.01) | |
| *C08G 59/50* | (2006.01) | |
| *C08L 63/00* | (2006.01) | |
| *C08G 59/32* | (2006.01) | |
| *C08G 59/26* | (2006.01) | |
| *C08G 59/18* | (2006.01) | |
| *B29C 70/48* | (2006.01) | |
| *C08L 63/04* | (2006.01) | |
| *C08L 9/06* | (2006.01) | |
| *C08L 51/04* | (2006.01) | |
| *C08G 59/22* | (2006.01) | |

(52) U.S. Cl.
CPC .............. *C08G 59/38* (2013.01); *B29C 70/48* (2013.01); *C08G 59/188* (2013.01); *C08G 59/226* (2013.01); *C08G 59/26* (2013.01); *C08G 59/3218* (2013.01); *C08G 59/5033* (2013.01); *C08L 63/00* (2013.01); *C08L 63/04* (2013.01); *C08G 2120/00* (2013.01); *C08L 9/06* (2013.01); *C08L 2207/53* (2013.01)

(58) Field of Classification Search
CPC .... B29C 70/48; C08G 59/26; C08G 59/5033; C08G 59/38; C08G 59/3218; C08G 59/188; C08G 2120/00; C08L 63/04; C08L 63/00; C08L 9/06; C08L 2207/53
USPC ........................................................ 523/427
See application file for complete search history.

(56) References Cited

U.S. PATENT DOCUMENTS

| 4,684,678 A | 8/1987 | Schultz et al. | |
|---|---|---|---|
| 2011/0151232 A1* | 6/2011 | Meegan | B29C 70/025 |
| | | | 428/221 |
| 2016/0152763 A1* | 6/2016 | Meegan | C07C 211/50 |
| | | | 523/400 |
| 2016/0176083 A1* | 6/2016 | Meegan | C08K 3/01 |
| | | | 523/467 |
| 2017/0158829 A1* | 6/2017 | Hondo | C08J 5/24 |

FOREIGN PATENT DOCUMENTS

| EP | 0397860 A1 | 11/1990 | |
|---|---|---|---|
| EP | 0595530 A1 * | 5/1994 | ........... C07D 493/04 |
| EP | 2333010 A1 | 6/2011 | |
| GB | 2460050 A | 11/2009 | |
| GB | 2506476 A | 4/2014 | |
| WO | WO-2016014536 A1 * | 1/2016 | ........... C07D 405/12 |

OTHER PUBLICATIONS

K.L. Hawthorne et al.: "High Performance Tris (hydroxyphenyl) methane-based Epoxy Resins", in "Epoxy Resin Chemistry II", Jun. 8, 1983, Amerian Chemical Society, Washington, D.C., vol. 221, pp. 135-151.

* cited by examiner

*Primary Examiner* — David T Karst
(74) *Attorney, Agent, or Firm* — Thi Dang

(57) ABSTRACT

Curable epoxy resin compositions suitable for liquid resin infusion processes. In one embodiment, the resin composition contains (a) at least two polyepoxides, one of which is triglycidyl ether of tris(hydroxyphenyl)methane, (b) an aromatic amine curing agent, and (c) core-shell rubber particles. In another embodiment, the resin composition (a) at least two polyepoxides, one of which is diglycidyl ether of bis(hydroxyphenyl)fluorene, (b) an aromatic amine curing agent, and (c) core-shell rubber particles.

5 Claims, No Drawings

RESIN COMPOSITIONS AND RESIN INFUSION PROCESS

The instant application claims the benefit of priority from United Kingdom Patent Application No. 1717639.7 filed on Oct. 26, 2017, the disclosure of which is incorporated herein by reference.

The present disclosure generally relates to the manufacturing of fiber-reinforced composite structures by a resin infusion process such as Resin Transfer Moulding (RTM) and resin compositions suitable for such resin infusion process.

DETAILED DESCRIPTION

Three-dimensional fiber-reinforced composite parts can be manufactured using different methods, one of which is liquid resin infusion. Resin Transfer Molding (RTM) and Vacuum-Assisted RTM (VARTM) are examples of manufacturing processes that involve injecting a liquid resin into a fibrous preform. During the RTM process, the preform is placed into an enclosed mold cavity, and the resin is injected into the cavity under pressure. The mold with the preform is often put under vacuum so that the vacuum removes all the entrapped air in the preform and speeds up the RTM process. Once the liquid resin fills the mold cavity, the resin is cured, resulting in the formation of a composite part. VARTM is similar to RTM except that a single-sided tool is normally used with vacuum bagging, and pressure gradient pushes the liquid resin into the preform. The fibrous preform is an assembly of dry reinforcement fibers, usually in the form of fabric plies which are laid up in a stacking arrangement. These techniques are well suited for the manufacturing of very complex-shape parts, in many cases at reasonable production rates.

Thermoset resins, particularly epoxy resins, have been widely used as matrix resins for such fiber-reinforced composite parts because of their desirable characteristics such as thermal and chemical resistance, adhesion and abrasion resistance. For RTM processing, dissolution of the cure agent into the resin phase facilitates a simple "heat, inject/wet out and cure" process methodology with the understanding and trade off that, due to the intimate mixing of the resin and cure agent, the resin composition displays an element of self-reactivity even at ambient temperatures. Curing agents that are widely used with epoxy resins for producing fiber-reinforced composite materials include, among others, aliphatic and aromatic amines. The structure of the curing agents and the reactivity of their functional groups are often used to control the reaction rate and the process-ability of the resin compositions.

When designing a fiber-reinforced polymer composite for a structural application such as aerospace application, it is desirable to boost the glass transition temperature ($T_g$), particularly, the wet $T_g$, of the cured polymer matrix and to reduce the cure speed while maintaining a high level of toughness in the polymer matrix and a high level of damage resistance in the cured composite material. Such properties would be particularly desirable for the manufacturing of aerospace structures such as fanblade, engine nacelle and containment casing where high toughness or resistance to high velocity impact is desired. Aerospace composite parts derived from fiber-reinforced polymer can be degraded by environmental attack such as moisture diffusion. Wet $T_g$ refers to the glass transition temperature of the cured material under conditions in which the material (in the form of a test coupon) is saturated with moisture, such conditions are deemed to be indicative of the in service environment. It is also desirable for aerospace composite parts derived from fiber reinforced polymer to show resistance to a change in material properties over their time in service. One method used to characterize this behavior is to hold the cured resin system at elevated temperatures and track the evolution of the glass transition temperature as a function of time at elevated temperature.

The present disclosure provides curable resin compositions that are suitable for liquid resin infusion processes, particularly RTM and VARTM.

According to one embodiment, the curable resin composition contains the following components:

(A) at least two polyepoxides, one of which is a difunctional epoxide and the other is triglycidyl ether of tris(hydroxyphenyl) methane represented by Formula I:

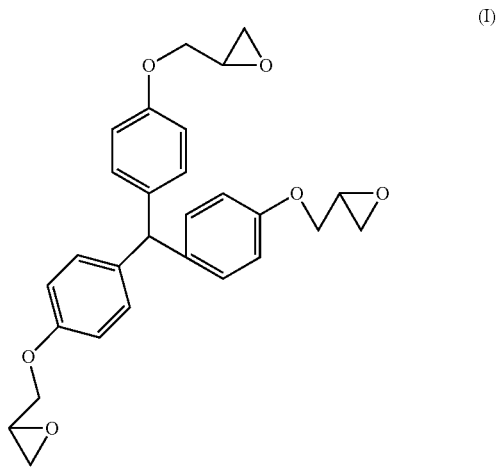 [SMILES: c1cc(C(c2ccc(OCC3CO3)cc2)c2ccc(OCC3CO3)cc2)ccc1OCC1CO1]

(B) at least one aromatic amine curing agent represented by Formula II:

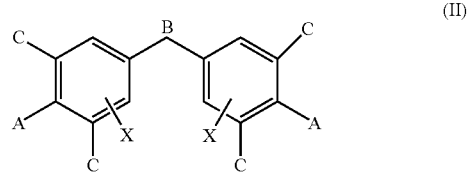

where A is an amine group represented by —NHR, R is independently selected from hydrogen, linear and branched alkyl groups having 1 to 6 carbon atoms ($C_1$-$C_6$), preferably A is $NH_2$;

B is selected from:

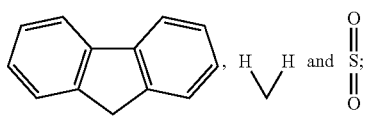

C is selected from $C_1$-$C_6$ alkyl groups and isopropyl groups; and X is a halogen selected from Cl, Br, F, I, or hydrogen (H); and (C) core-shell rubber particles.

The triglycidyl ether of tris (hydroxyphenyl) methane of Formula I is present in an amount greater than 0% and up to 18%, for example, 2% to 10%, by weight based on the total weight of the composition. A commercially available polyepoxide encompassed by Formula I is Tactix® 742 from Huntsman.

Suitable aromatic amine curing agents of Formula II include 9,9-bis(3-chloro-4-aminophenyl) fluorene (or CAF) and 9,9-bis(4-aminophenyl)fluorene, Formulas 1 and 2, respectively, below:

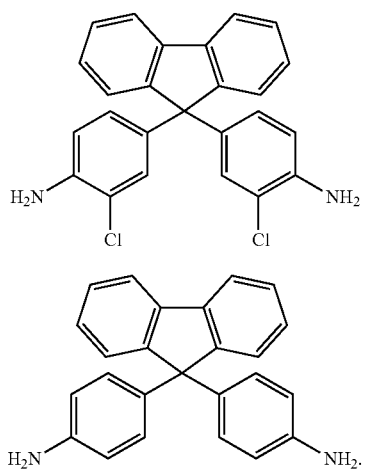

(1)

(2)

Other suitable aromatic amines of Formula II include:
4-methyl-9,9-bis(4-aminophenyl)fluorene,
4-chloro-9,9-bis(4-aminophenyl)fluorene,
2-ethyl-9,9-bis(4-aminophenyl)fluorene,
2-iodo-9,9-bis(4-aminophenyl)fluorene,
3-bromo-9,9-bis(4-aminophenyl)fluorene,
9-(4-methylaminophenyl)-9-(4-ethylaminophenyl)fluorene,
1-chloro-9,9-bis(4-aminophenyl)fluorene,
2-methyl-9,9-bis(4-aminophenyl)fluorene,
2,6-dimethyl-9,9-bis(4-aminophenyl)fluorene,
1,5-dimethyl-9,9-bis(4-aminophenyl)fluorene,
2-fluoro-9,9-bis(4-aminophenyl)fluorene,
1,2,3,4,5,6,7,8-octafluoro-9,9-bis(4-aminophenyl)fluorene,
2,7-dinitro-9,9-bis(4-aminophenyl)fluorene,
2-chloro-4-methyl-9,9-bis(4-aminophenyl)fluorene,
2,7-dichloro-9,9-bis(4-aminophenyl)fluorene,
2-acetyl-9,9-bis(4-aminophenyl)fluorene,
2-methyl-9,9-bis(4-methylaminophenyl)fluorene,
2-chloro-9,9-bis(4-ethylaminophenyl)fluorene,
2-t-butyl-9,9-bis(4-methylaminophenyl)fluorene.

Also suitable are 4,4'-methylene-bis-(3-chloro-2,6-diethylaniline) (MCDEA); 4,4'-methylene-bis-(2-isopropyl-6-methylaniline) (MMIPA). Other aromatic amines of Formula II, where B is O=S=O, include 4,4'-diaminodiphenyl sulfone (4,4'-DDS) and 3,3'-diaminodiphenyl sulfone (3,3'-DDS) represented by the Formulas 3 and 4, respectively:

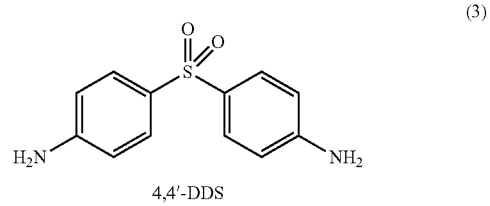

(3)

4,4'-DDS

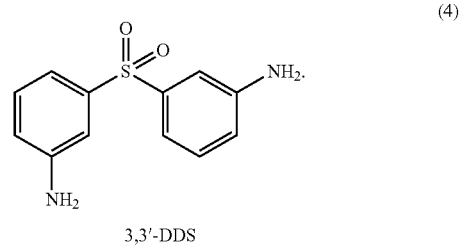

(4)

3,3'-DDS

The term "polyepoxide" refers a compound that contains more than one epoxide group:

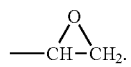

Difunctional epoxides are polyepoxides with two functional groups. Suitable difunctional epoxides include those with low viscosity at room temperature (e.g., <1000 cP at 25° C.). Specific examples of difunctional epoxides are the epoxidized reaction products of diphenols or dialkene compounds such as diglycidyl ether of Bisphenol F, Bisphenol A, or Bisphenol Z; diglycidyl ether of butanediol (e.g., Araldite® DY-D from Huntsman); low-viscosity cycloaliphatic epoxy resin having an epoxy content of 6.8-8.0 equiv./kg and viscosity @25° C. of 100-600 cP (e.g., Araldite® CY 179 from Huntsman).

Other suitable difunctional epoxides include the compounds (or monomers) of Formulas 5 and 6 below:

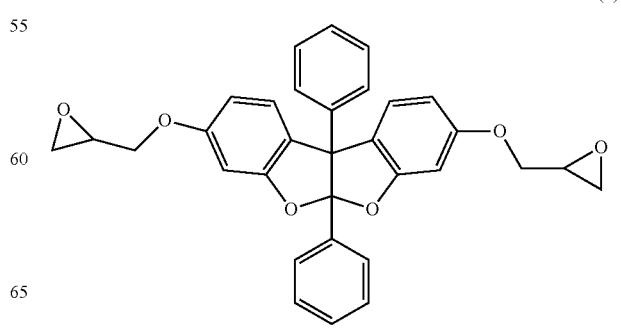

(5)

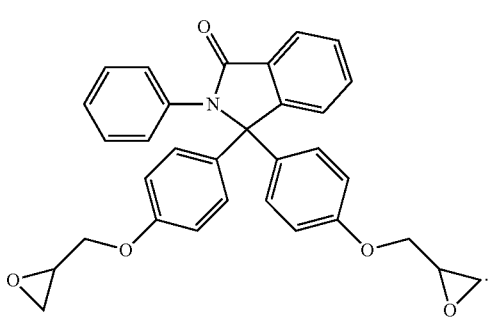

(6)

The difunctional epoxide may be present in an amount up to 50 wt %, for example, 24% to 38%, by weight based on the total weight of the composition.

It appears that the presence of polyepoxide of Formula I and the aromatic amine of Formula II CAF in the resin composition contribute to an increase in the wet $T_g$ of the cured resin matrix while maintaining a high level of toughness when compared to the same resin composition without the polyepoxide of Formula I. Additionally, the polyepoxide of Formula I appears to offer an improvement in $T_g$ stability at elevated temperature, when compared to other well-known multifunctional resins such as Araldite® MY0510 (triglycidyl p-aminophenol), MY0610 (triglycidyl m-aminophenol) and MY721 (tetraglycidyl diaminodiphenyl methane) from Huntsman.

The curable resin composition disclosed above may further includes an epoxy novolac resin represented by Formula III:

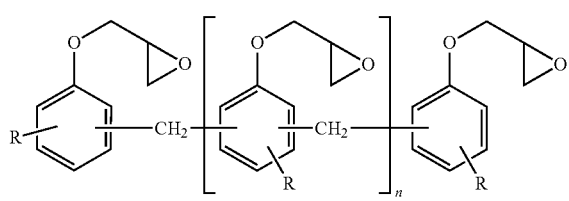

(III)

where n=1 to 5, R=H.

A particularly suitable epoxy novolac resin is that represented by the following formula:

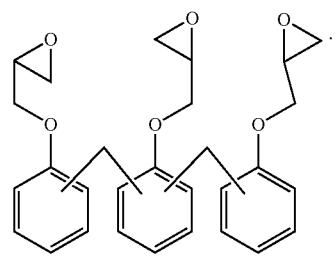

Such epoxy novolac resin is commercially available as D.E.N.™ 431 from Dow Chemical Co.

The epoxy novolac resin may be present in an amount of greater than 0% and up to 18%, for example, 1% to 7%, by weight based on the total weight of the composition.

The curable resin composition disclosed above may further include a fluorenyl epoxy, particularly, diglycidyl ether of bis(hydroxyphenyl)fluorene represented by Formula IV:

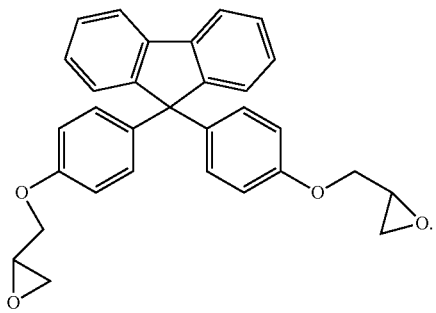

(IV)

When present, the fluorenyl epoxy may be present in an amount of greater than 0% and up to 20%, for example, 4% to 18%, by weight based on the total weight of the composition.

It appears that the presence of fluorenyl epoxide of Formula IV and the aromatic amine of Formula II, e.g. CAF, in the resin composition contribute to an increase in the wet $T_g$ of the cured resin matrix when compared to the same resin composition without the fluorenyl epoxide. In some embodiments, the epoxy resin composition is void of any naphthalene-based epoxy having one or more naphthalene rings in its formula.

According to yet another embodiment, the resin composition contains the following components:

(A) at least two polyepoxides, one of which is a fluorenyl epoxy, particularly, the compound represented by Formula IV disclosed above, and the other polyepoxide is a naphthalene-based epoxy;

(B) an aromatic amine curing agent represented by Formula II disclosed above; and (C) core-shell rubber particles.

The naphthalene-based epoxy having at least one naphthalene ring structure (or fused pair of benzene rings) in its formula:

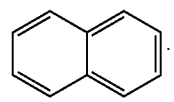

The naphthalene-based epoxy may be selected from: diglycidyl ether of 1,6-dihydroxy naphthalene; 1,7-dihydroxy naphthalene; 1 naphthalene cresol glycidyl ether; 1,2-dihydroxynaphthalene; 1,3-dihydroxynaphthalene; 1,4-dihydroxynaphthalene; 1,5-dihydroxynaphthalene; 2,3-dihydroxynaphthalene; 2,7-dihydroxynaphthalene; and combination thereof.

The naphthalene-based epoxy may be present in an amount greater than 0% and up to 30%, for example, 21%-30%, by weight based on the total weight of the composition.

In the various embodiments described herein for the curable resin composition, the molar ratio (A:B) of the combination of all aromatic amine ("A") to polyepoxides ("B"), A/B may be in the range of 1 to 2 (1:1 to 2:1), preferably, 1.5 to 1.6 (15:10 to 16:10).

The epoxy resin compositions described herein preferably has a viscosity of less than 10 Poise, preferably, less than 5 poise or less than 3 Poise, at a temperature within the range of 90° C. to 160° C.

The term "curing" or "cure" in this disclosure refers to the hardening of a thermosettable material (prepolymer or resin or monomers) brought on by heat, chemical reaction or irradiation. The process of curing changes the resin into an infusible, insoluble crosslinked polymer network. In the context of curable resin composition, the term "curable" means that the composition is capable of being subjected to conditions such as heat which will transform the composition from a viscous liquid state to a hardened state.

Core-Shell Particles

The core-shell rubber (CSR) particles function as a toughening agent in the epoxy-based resin composition. Preferably, the core-shell rubber particles have particle size (d90) of less than 800 nm, for example, 100 nm to 200 nm. The relative amount of CSR particles in the resin composition may be 1% to 20%, in some embodiments, 0.3% to 10%, by weight based on the total weight of the composition.

The CSR particle has an inner core portion and an outer shell portion which substantially encases the inner core portion. The core portion is preferably a polymeric material having an elastomeric or rubber property, i.e. a relatively low glass transition temperature (particularly relative to the material of the outer shell portion) and preferably less than about 0° C., e.g. less than about −30° C. The outer shell portion is preferably a glassy polymeric material, i.e. a thermoplastic or cross-linked thermoset polymer having a glass transition temperature greater than ambient temperature (20° C.), preferably greater than about 50° C.

The core of the CSR particle may be a butadiene/styrene copolymer similar to a rubber compound and the shell may be an acrylate, for example, a homopolymer or copolymer of methylmethacrylate.

In some embodiments, the resin composition is void of any thermoplastic polymers such as polyarylsulfones (including polyethersulfone (PES), polyaryletherethersulfone (PEES), and copolymer thereof), polyarylethers, polyarylsulphides and polyphenylene oxide (PPO) in order to maintain the viscosity at a desired low level.

Optional Additives

The curable resin composition may include optional additives such as nano-sized inorganic particles such as silica. The inorganic particles have a particle size in the range of from about 2.0 nm to about 800 nm, preferably no more than 500 nm, in some embodiments, no more than 100 nm. The amount of such optional additives is no more than 5.0% by weight of the curable resin composition.

Resin Infusion Method and Manufacturing of Molded Articles

The curable epoxy-based resin composition of the present disclosure is suitable for liquid resin infusion, including RTM and VaRTM. A molded article can be produced by providing a fibrous preform, infusing the fibrous preform with the curable epoxy resin composition disclosed herein, and curing the resin-infused preform. The fibrous preform is porous and permeable with respect to liquid resin composition. To form the preform, multiple plies of textile material are laid up to a desired thickness.

The preform may be placed in a closed mold prior to resin infusion. The mold is heated to an initial temperature and the resin composition with a sufficiently low viscosity is injected into the mold to infuse the preform with the resin. The resin-infused preform is then cured at a curing temperature ($T_c$), which is higher than the initial temperature, for a time period sufficient to form a hardened composite article.

Property Measurement

Particle Size

In the present disclosure, particle size is measured by dynamic light scattering, for example, using a Malvern Zetasizer 2000. Particle size (d90) defines the particle size distribution (volume-based) such that 90% of the particles have a particle size below this value.

Viscosity

The viscosity measurements are in steady conditions using a Brookfield viscometer according to the ASTM standard D2196.

Glass Transition Temperature

In the present disclosure, the glass transition temperature ($T_g$) is determined by Differential Scanning calorimetry (DSC) at ramp rate of 5° C./min.

Examples

Some exemplary resin compositions for RTM processes are shown in Tables 1-3.

TABLE 1

| Components | (wt %) |
|---|---|
| Diglycidyl ether of Bisphenol F (PY 306) | 38 |
| Triglycidyl ether of tris (hydroxyphenyl) methane (Tactix 742) | 9 |
| Fluorenyl amine (CAF) | 47 |
| CSR particles | 6 |

TABLE 2

| Components | (wt %) |
|---|---|
| Diglycidyl ether of Bisphenol F (PY 306) | 30 |
| Triglycidyl ether of tris (hydroxyphenyl) methane (Tactix 742) | 9 |
| Bisphenol F Novolac epoxy resin (DEN 431) | 4 |
| Diglycidyl ether of bis(hydroxyphenyl)fluorene (LME10169) | 4 |
| Fluorenyl amine (CAF) | 47 |
| CSR particles | 6 |

TABLE 3

| Components | (wt %) |
| --- | --- |
| Diglycidyl ether of Bisphenol F (PY 306) | 0-30 |
| Diglycidyl ether of 1,6-dihydroxy naphthalene (MY0816) | 22 |
| Diglycidyl ether of bis(hydroxyphenyl)fluorene (LME10169) | 28 |
| Fluorenyl amine (CAF) | 44 |
| CSR particles | 6 |

PY 306, MY0816 and LME10169 are available from Huntsman Advanced Materials.

What is claimed is:

1. A curable epoxy resin composition suitable for liquid resin infusion, comprising:
    (A) a combination of polyepoxides consisting of: (i) triglycidyl ether of tris(hydroxyphenyl)-methane represented by Formula I:

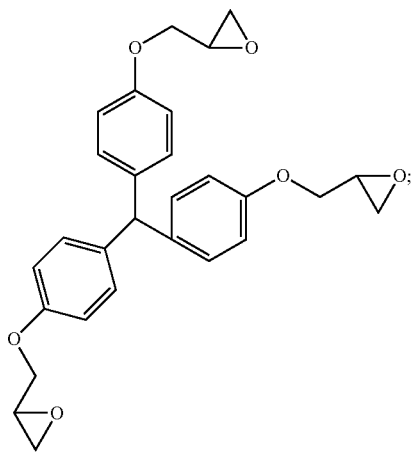

(ii) diglycidyl ether of Bisphenol F or Bisphenol A;
(iii) a difunctional epoxide represented by the following Formula II:

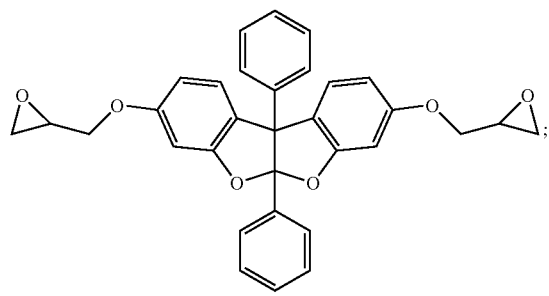

and
(iv) an epoxy novolac resin represented by the following Formula III:

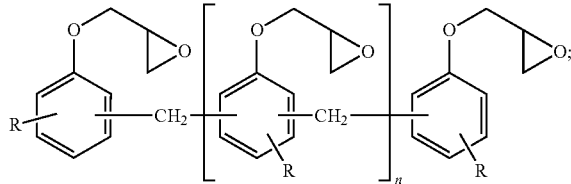

where n=1 to 5, and R=H
    (B) 9,9-bis(4-amino-3-chlorophenyl)fluorene and/or 9,9-bis(4-aminophenyl)fluorene; and
    (C) core-shell rubber particles,
    wherein the weight percentages of the polyepoxides, based on the total weight of the epoxy resin composition, are as follows: 2% to 10% polyepoxide (i); 24% to 38% polyepoxides (ii) and (iii) combined; and 1% to 7% polyepoxide (iv),
    wherein the molar ratio of component (B) to component (A) is 1:1 to 2:1,
    wherein the amount of core-shell rubber particles is in the range of 0.3% to 10% by weight, based on the total weight of the epoxy resin composition, and
    wherein the curable epoxy resin composition is void of any thermoplastic polymer.

2. The curable epoxy resin composition of claim 1, wherein the epoxy novolac resin is represented by the following formula:

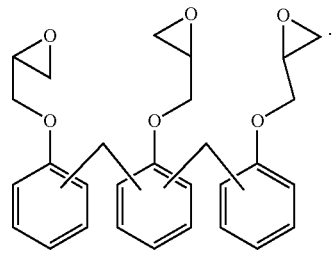

3. The curable epoxy resin composition of claim 1, wherein the curable epoxy resin composition has viscosity of less than 10 Poise at a temperature within the range of 90° C. to 160° C.

4. A liquid resin infusion (LRI) manufacturing method for producing a molded article, comprising the steps of providing a fibrous preform configured to receive liquid resin, infusing the fibrous preform with the curable epoxy resin composition of claim 1, and curing the resin-infused preform at a curing temperature ($T_c$).

5. The method of claim 4, further comprising:
    a. placing the fibrous preform in a closed mold;
    b. heating the mold to an initial temperature;
    c. injecting the curable epoxy resin composition into the mold so as to infuse the fibrous preform with the epoxy resin composition; and
    d. curing the resin-infused preform at the curing temperature ($T_c$), which is higher than the initial temperature, for a time period sufficient to form a hardened article.

* * * * *